United States Patent
Nagasaka et al.

(10) Patent No.: US 10,037,037 B1
(45) Date of Patent: Jul. 31, 2018

(54) SYSTEMS AND METHODS FOR TRAJECTORY PLANNING IN AN AUTONOMOUS VEHICLE USING DIFFERENT FIXED DURATIONS FOR STEERING AND SPEED PARAMETERS

(71) Applicant: Toyota Motor Engineering & Manufacturing North America, Inc., Erlanger, KY (US)

(72) Inventors: Naoki Nagasaka, Ann Arbor, MI (US); Nobuhide Kamata, Ann Arbor, MI (US); Masahiro Harada, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/430,311

(22) Filed: Feb. 10, 2017

Related U.S. Application Data

(60) Provisional application No. 62/447,740, filed on Jan. 18, 2017.

(51) Int. Cl.
  *G01C 22/00* (2006.01)
  *G05D 1/02* (2006.01)
  (Continued)

(52) U.S. Cl.
  CPC .......... *G05D 1/0219* (2013.01); *B60W 10/04* (2013.01); *B60W 10/184* (2013.01);
  (Continued)

(58) Field of Classification Search
  CPC .. G05D 1/0219; G05D 1/0088; G05D 1/0223; G05D 2201/0213; B60W 10/04;
  (Continued)

(56) References Cited

U.S. PATENT DOCUMENTS

| 5,612,883 A * | 3/1997 | Shaffer | B60K 31/0008 340/435 |
| 9,623,905 B2 * | 4/2017 | Shashua | B62D 15/025 |

FOREIGN PATENT DOCUMENTS

| JP | 2013112068 A | 6/2013 |
| JP | 2013112069 A | 6/2013 |

(Continued)

*Primary Examiner* — Gertrude Arthur Jeanglaude
(74) *Attorney, Agent, or Firm* — Christopher G. Darrow; Darrow Mustafa PC

(57) ABSTRACT

System, methods, and other embodiments described herein relate to autonomously controlling a vehicle according to a trajectory plan. In one embodiment, a method includes updating, upon traveling over at least a portion of a current segment of a roadway, the trajectory plan for a subsequent segment of the roadway by setting a fixed portion of the trajectory plan to include: (i) a steering parameter to be fixed for a first duration of time and (ii) a speed parameter to be fixed for a second duration of time. The first duration of time and the second duration of time are of different lengths. The method includes computing input controls for autonomously controlling the vehicle according to the fixed portion of the trajectory plan. The method includes controlling the vehicle according to the input controls over the subsequent segment of the roadway.

20 Claims, 6 Drawing Sheets

(51) Int. Cl.
    *G05D 1/00*      (2006.01)
    *B60W 10/20*     (2006.01)
    *B60W 10/04*     (2006.01)
    *B60W 10/184*    (2012.01)
    *B60W 30/12*     (2006.01)
    *B60W 30/18*     (2012.01)

(52) U.S. Cl.
    CPC ............ *B60W 10/20* (2013.01); *B60W 30/12* (2013.01); *B60W 30/18009* (2013.01); *G05D 1/0088* (2013.01); *G05D 1/0223* (2013.01); *B60W 2550/10* (2013.01); *B60W 2550/14* (2013.01); *B60W 2550/20* (2013.01); *B60W 2600/00* (2013.01); *G05D 2201/0213* (2013.01)

(58) Field of Classification Search
    CPC .... B60W 10/184; B60W 10/20; B60W 30/12; B60W 30/18009; B60W 2550/10; B60W 2550/14; B60W 2550/20; B60W 2600/00
    USPC .............................................. 701/25, 36, 93
    See application file for complete search history.

(56) References Cited

FOREIGN PATENT DOCUMENTS

| | | |
|---|---|---|
| JP | 2013186724 A | 9/2013 |
| JP | 5780133 B2 | 9/2015 |

\* cited by examiner

SYSTEMS AND METHODS FOR TRAJECTORY PLANNING IN AN AUTONOMOUS VEHICLE USING DIFFERENT FIXED DURATIONS FOR STEERING AND SPEED PARAMETERS

CROSS REFERENCE TO RELATED APPLICATIONS

This application claims benefit of U.S. Provisional Application No. 62/447,740, filed on Jan. 18, 2017, which is herein incorporated by reference in its entirety.

TECHNICAL FIELD

The subject matter described herein relates in general to systems for planning a trajectory of an autonomous vehicle and, more particularly, to separately fixing durations of steering parameters and speed parameters within a trajectory plan used to control, at least in part, the autonomous vehicle.

BACKGROUND

Autonomously controlling a vehicle is a complex task that includes many different aspects. For example, the vehicle may plan a trajectory along a route to follow when operating autonomously. In general, the vehicle may use the planned trajectory to determine inputs for controlling the vehicle along the route. Therefore, the vehicle may include many different sensor systems to capture data about surroundings that are then used as inputs to compute the planned trajectory and control inputs. Additionally, the trajectory plan may be computed to a defined distance in front of the vehicle and then updated as the vehicle travels along the road and as operating conditions change (e.g., traffic, obstacles, etc.).

Moreover, as indicated, the trajectory plan is used by the vehicle as an input to determine how to control the vehicle at discrete instances in time. Thus, the vehicle uses an upcoming next portion of the trajectory plan as a target to compute controls for autonomously controlling the vehicle. However, the process of computing the trajectory plan can be computationally intensive. Therefore, latencies can be introduced into how the controls are computed if the vehicle updates the trajectory plan during or just after computing the controls. As a result, the vehicle may be operated with sudden movements due to the trajectory plan varying for a current segment of the road. Consequently, passengers may experience unexpected maneuvers that impact an overall ride experience.

SUMMARY

An example of a trajectory planning system that sets steering parameters and speed parameters of a trajectory plan to be fixed for different durations is presented herein. In one embodiment, the trajectory planning system updates a trajectory plan to fix steering parameters and speed parameters according to different durations of time for an immediately upcoming segment of a roadway. Accordingly, the trajectory planning system can then use the fixed parameters to compute controls over the segment without the parameters changing after or while the controls are being computed. In this way, the trajectory planning system can improve control of the vehicle to provide for smooth operation and avoid unexpected sudden maneuvers introduced from computing latencies when operating autonomously.

In one embodiment, a trajectory planning system of a vehicle is disclosed. The trajectory system includes one or more processors and a memory that is communicably coupled to the one or more processors. The memory stores a planning module that includes instructions that when executed by the one or more processors cause the one or more processors to update, upon traveling over at least a portion of a current segment of a roadway, the trajectory plan for a subsequent segment of the roadway by setting a fixed portion of the trajectory plan to include: (i) a steering parameter of the trajectory plan to be fixed for a first duration of time and (ii) a speed parameter of the trajectory plan to be fixed for a second duration of time. The first duration of time and the second duration of time are of different lengths. The memory stores a control module that includes instructions that when executed by the one or more processors cause the one or more processors to compute input controls for autonomously controlling the vehicle according to the fixed portion of the trajectory plan. The control module includes instructions to control the vehicle over the subsequent segment of the roadway according to the input controls.

In one embodiment, a non-transitory computer-readable medium is disclosed. The computer-readable medium stores instructions that when executed by one or more processors cause the one or more processors to perform the disclosed functions. The instructions include instructions to update, upon traveling over at least a portion of a current segment of a roadway, the trajectory plan for a subsequent segment of the roadway by setting a fixed portion of the trajectory plan to include: (i) a steering parameter to be fixed for a first duration of time and (ii) a speed parameter to be fixed for a second duration of time. The first duration of time and the second duration of time are of different lengths. The instructions include instructions to compute input controls for autonomously controlling the vehicle according to the fixed portion of the trajectory plan. The instructions include instructions to control the vehicle over the subsequent segment of the roadway according to the input controls.

In one embodiment, a method of autonomously controlling a vehicle according to a trajectory plan is disclosed. The method includes updating, upon traveling over at least a portion of a current segment of a roadway, the trajectory plan for a subsequent segment of the roadway by setting a fixed portion of the trajectory plan to include: (i) a steering parameter to be fixed for a first duration of time and (ii) a speed parameter to be fixed for a second duration of time. The first duration of time and the second duration of time are of different lengths. The method includes computing input controls for autonomously controlling the vehicle according to the fixed portion of the trajectory plan. The method includes controlling the vehicle according to the input controls over the subsequent segment of the roadway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented

DETAILED DESCRIPTION

Figure 1:
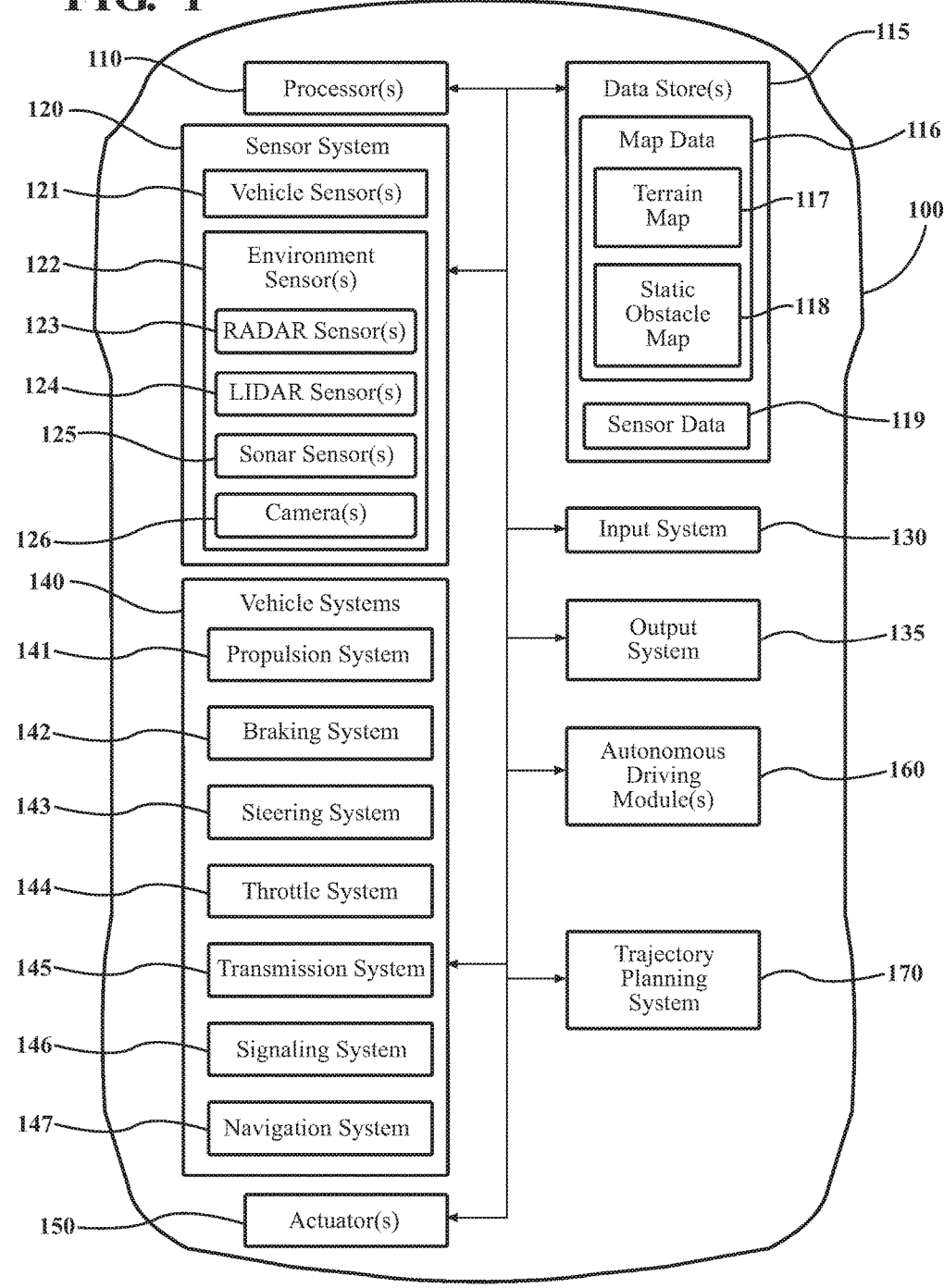
FIG. 1 illustrates one embodiment of a vehicle within which systems and methods disclosed herein may be implemented.

Systems, methods and other embodiments associated with fixing steering parameters and speed parameters of a trajectory plan for separate durations are disclosed. As mentioned in the background, a vehicle operating in an autonomous mode may make some maneuvers in a manner that is not fully optimal and seamless to a passenger. These maneuvers may be due to an incoming portion of a trajectory plan being updated when driving controls are being computed from the same portion, thereby causing latencies within the computation of the driving controls. Furthermore, discrepancies in how the driving input controls are computed may be derived from, in one example, steering and speed parameters of the trajectory plan for a current segment of a road being fixed for the same duration. Thus, using the same fixed duration for the separate parameters may cause difficulties with computing the driving input controls because of an inability to update the trajectory plan at a sufficient granularity for particular a parameter.

Therefore, in one embodiment, the trajectory planning system individually sets the speed and steering parameters according to separately defined fixed durations of time. For example, in one embodiment, the trajectory planning system iteratively updates a trajectory plan as the vehicle progresses along a road. The trajectory planning system may generate the trajectory plan from data collected by sensors of the vehicle, stored route information and other data that is useful in generating the trajectory plan. In one embodiment, the trajectory plan includes a series of target locations along a road that together indicates a path or course along which the vehicle is to travel in order to, for example, effectively navigate through the environment. Moreover, in one embodiment, the trajectory plan also includes steering parameters and speed parameters that separately define steering angles/directions and speeds at the separate target locations.

Additionally, the trajectory planning system uses the trajectory plan to compute driving input controls for controlling the vehicle over a current segment of the road. More particularly, the trajectory planning system uses the nearest portion of the trajectory plan to compute the input controls. Thus, when updating the trajectory plan, the trajectory planning system fixes or otherwise sets steering parameters such that the steering parameters for a subsequent segment are unmodifiable for a first duration of time and sets speed parameters for the subsequent segment to be unmodifiable for a second duration of time that is different from the first duration of time. By separately setting the fixed durations of time for the separate parameters, the trajectory planning system can avoid latencies introduced when computing the input controls while the trajectory plan is being updated thereby providing for seamlessly control the vehicle. Additionally, this is in contrast to portions of the trajectory plan that are associated with portions of the road occurring further along a route which are added and iteratively updated as the vehicle progresses.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that is autonomously controlled and benefits from separately setting fixed durations for control parameters of a trajectory plan to improve the operation of the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a trajectory planning system 170 that is implemented to perform methods and other functions as disclosed herein relating to setting fixed durations of different lengths for steering and speed parameters within a trajectory plan when operating the vehicle in an autonomous mode. The noted functions and methods will become more apparent with a further discussion of the figures.

Figure 2:
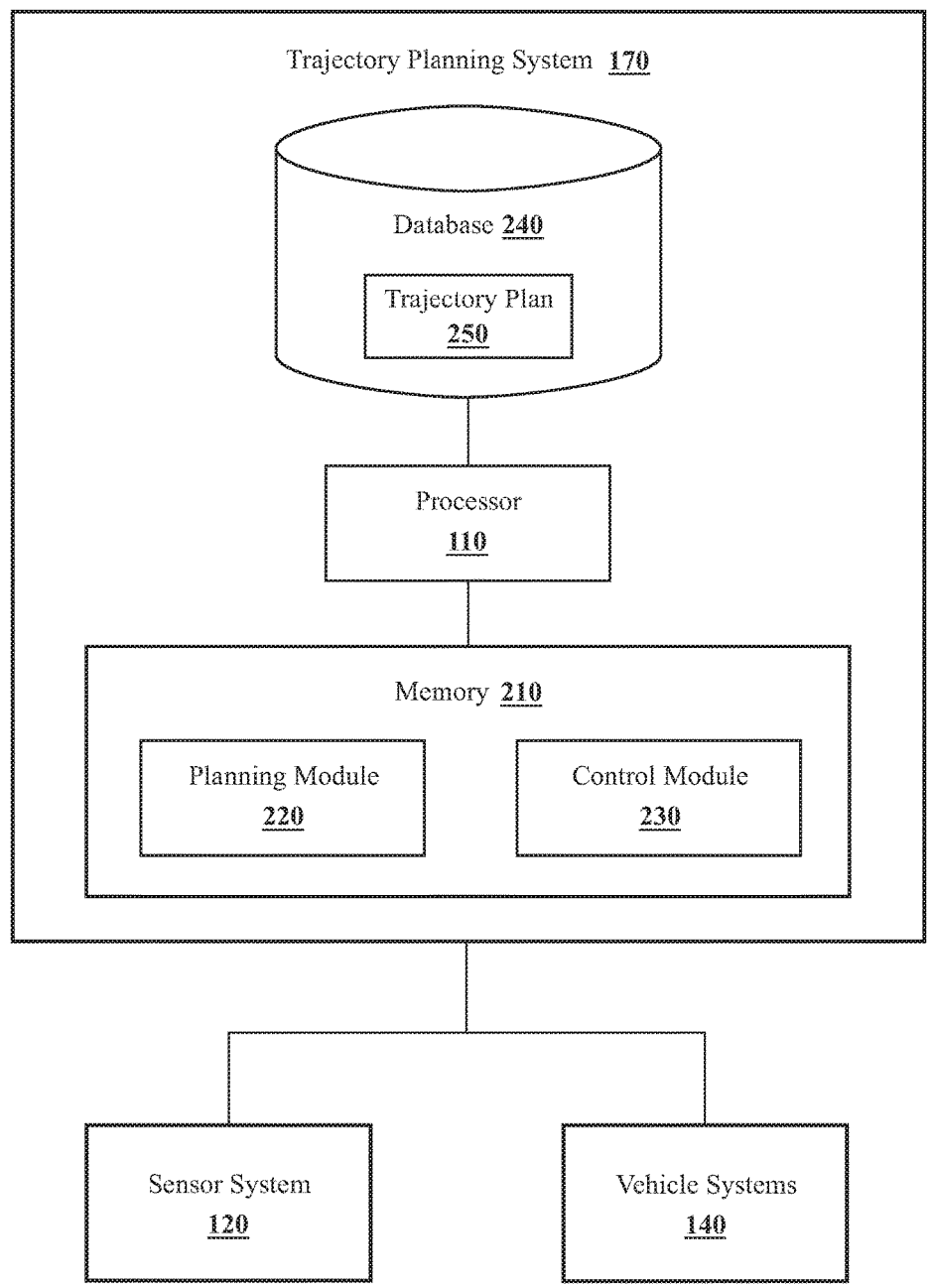
FIG. 2 illustrates one embodiment of a trajectory planning system that is associated with separately fixing steering parameters and speed parameters of a trajectory plan for different durations.

With reference to FIG. 2, one embodiment of the trajectory planning system 170 of FIG. 1 is further illustrated. The trajectory planning system 170 is shown as including the processor 110 from the vehicle 100 of FIG. 1. Accordingly, the processor 110 may be a part of the trajectory planning system 170, the trajectory planning system 170 may include a separate processor from the processor 110 of the vehicle 100 or the trajectory planning system 170 may access the processor 110 through a data bus or another communication path. In one embodiment, the trajectory planning system 170 includes a memory 210 that stores a planning module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the planning module 220 generally includes instructions that function to control the processor 110 to retrieve data (e.g., data from a memory or from sensors of the sensor system 120) and analyze the data to generate/update the trajectory plan 250 of the vehicle 100. In other words, the planning module 220 includes instructions to identify surroundings, operating characteristics, and so on (e.g., present context) of the vehicle 100 and update the trajectory plan 250 according to the context. The planning module 220, in one embodiment, iteratively executes the updating as the vehicle 100 progresses along the road so that the trajectory plan 250 remains accurate according to changing circumstances and is available to a defined distance (e.g., 500 m) ahead of the vehicle 100. Thus, the planning module 220, in one embodiment, generates the trajectory plan 250 according to surroundings (e.g., other vehicles, speed limits, location, road conditions, etc.) and a general context (e.g., current day, current time, route, current segment along a route, etc.) of the vehicle 100 so that the vehicle 100 can operate autonomously according to control inputs produced by the control module 230.

Additionally, in one embodiment, the control module 230 includes instructions that function to control the processor 110 to compute driving input controls for autonomously controlling the vehicle 100 over a current segment of the roadway using a fixed portion of the trajectory plan 250. In other words, the control module 230 uses the next portion of trajectory plan 250 that is, for example, at a head of a queue. Thus, the next portion correlates with a current segment of the roadway over which the vehicle 100 is about to travel. The next portion is also a fixed portion of the trajectory plan 250. It should be noted that the fixed portion is offset in duration for the steering parameters (i.e., lateral parameters) and the speed parameters (i.e., longitudinal parameters) since the two parameters are fixed for different individual durations, as will be discussed in greater detail subsequently.

With continued reference to the trajectory planning system 170, in one embodiment, the system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various determinations. In one embodiment, the database 240 includes lookup tables of control profiles, travel logs that provide a history of past trips/events (e.g., historical driving patterns) including driving inputs throughout the trips/events, data of the environmental context, driver information (e.g., ID), data for autonomously controlling the vehicle 100 and so on.

Additionally, in one embodiment, the database 240 stores the trajectory plan 250. Alternatively, the trajectory planning system 170 stores the trajectory plan 250 in the memory 210, a specialized data structure (e.g., queue, linked-list, etc.), a cache memory, or another suitable data storage component.

In either case, the trajectory plan 250 defines a course for controlling the vehicle 100 over a roadway. In one embodiment, the trajectory plan 250 is comprised of a series of target points that identify locations along the roadway that are targets over which the vehicle 100 is intended pass when being autonomously controlled. Moreover, the trajectory plan 250 may also indicate for each target point a separate steering parameter and a separate speed parameter. The steering parameter can indicate, for example, a steering angle control input at an associated target point. The speed parameter can indicate, for example, a speed at an associated target point and/or acceleration/deceleration control inputs.

Furthermore, as previously described, the trajectory plan 250 includes a leading portion that is fixed (e.g., unmodifiable or protected from alteration) and is referred to as the fixed portion of the trajectory plan 250. The fixed portion of the trajectory plan 250 is, in one embodiment, a portion that is at a head of a linked list or queue and is for an immediately upcoming section of the roadway. Moreover, in general, the fixed portion is a segment extending ahead of the vehicle 100 by an amount defined according to separate durations for the steering parameters and the speed parameters. Thus, the fixed portion extends ahead of the vehicle 100 by different amounts for the speed parameters and the steering parameters since the fixed durations for each of the parameters differs. Furthermore, in one embodiment, the fixed durations for the separate parameters are individually defined and programmed as part of an initial configuration of the trajectory planning system 170.

In still further embodiments, the planning module 220 selects the relative fixed durations for the separate parameters according to contextual data obtained from sensors or otherwise known about a current location/route. For example, the planning module 220 selects the steering parameters to have a shorter fixed duration than the speed parameters when traveling within a context where the speed is likely to be consistent (e.g., on a highway), but steering maneuvers may need to be quickly calculated from swerving vehicles or other obstacles. By contrast, the planning module 220, in one example, selects the speed parameter to have a shorter fixed duration than the steering parameter when traveling within a context where the steering is likely to be consistent because it is, for example, restricted (e.g., driving along a cliff on a mountain road) or otherwise not likely to change, but speed maneuvers may need to be quickly calculated to decelerate for obstacles, traffic, and so on.

In either case, the fixed portion for the steering parameters and the speed parameters are of different durations (e.g., 1 second vs. 0.5 seconds) whether preselected or dynamically selected by the planning module 220. In this way, data of the trajectory plan 250 that is used by the control module 230 to compute driving input controls for controlling the vehicle 100 autonomously can be protected from alteration and are assured to be available for computing the driving input controls when needed.

Figure 3:
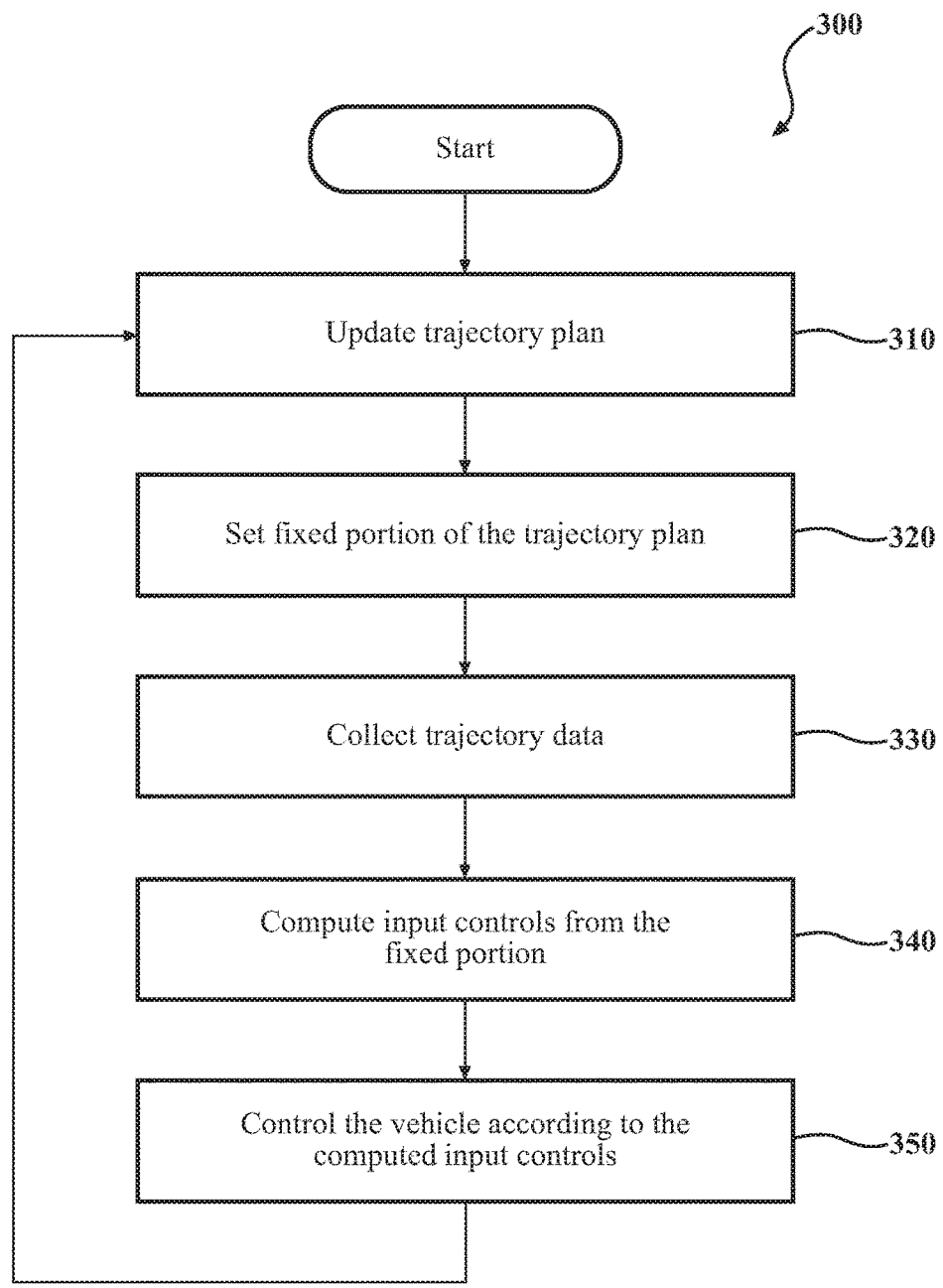
FIG. 3 illustrates one embodiment of a method that is associated with separately setting steering parameters and speed parameters of a trajectory plan for different fixed durations.

Additional aspects of independently setting fixed portions of the speed parameters and the steering parameters for a trajectory plan will be discussed in relation to FIG. 3. FIG. 3 illustrates a method 300 associated with autonomously controlling a vehicle using at least a trajectory plan that includes fixed portions of different durations. Method 300 will be discussed from the perspective of the trajectory planning system 170 of FIGS. 1 and 2. While method 300 is discussed in combination with the trajectory planning system 170, it should be appreciated that the method 300 is not limited to being implemented within the trajectory planning system 170, but is instead one example of a system that may implement the method 300.

At 310, the trajectory plan is updated. In one embodiment, the planning module 220 updates the trajectory plan 250 at, for example, a particular frequency (e.g., a rate of 10 Hz). That is, the planning module 220 updates the trajectory plan 250 at discrete points in time that are, for example, every 0.1 seconds. Additionally, in one embodiment, the planning module 220 updates the trajectory plan in two parts at 310 and 320. That is, the planning module 220 updates aspects of the data itself of the trajectory plan 250 at 310 by adjusting aspects of the parameters, whereas at 320, the planning module 220 updates the trajectory plan by updating which portions are part of the fixed portion as will be discussed further subsequently.

In either case, at 310, the planning module 220 updates target points that form the trajectory plan 250. In one example, the planning module 220 updates the target points by adjusting locations of the target points and/or other data (e.g., steering and speed parameters) of the target points. Moreover, the planning module 220 can adjust the target points according to collected trajectory data in order to account for a present changing context of the vehicle due to obstacles, weather, traffic, and so on.

It should be noted that while blocks 310 and 320 are illustrated as occurring in serial prior to blocks 330, 340, and 350, in one embodiment, the blocks 310 and 320 are executed in parallel with the blocks 330, 340, and 350. Thus, the trajectory data collected at 330 is, for example, available to the planning module 220 at 310 even though collecting of the data is illustrated as being subsequent at 330. Collecting of the trajectory data will be discussed in further detail at 330.

The planning module 220 updates the trajectory plan 250 by adjusting target points that comprise the trajectory plan 250 and, in one embodiment, by also adding additional target points to an end of the trajectory plan 250 to account for a distance traveled by the vehicle 100 since the trajectory plan 250 was last updated. Of course, as will be discussed in greater detail at 320, the fixed portion of the trajectory plan 250 is protected from alteration or otherwise locked and thus target points within the fixed portion.

Additionally, as mentioned, the planning module 220 updates the trajectory plan 250 at a rate such that the vehicle 100, for example, travels through part of the trajectory plan 250 between updates. More specifically, the vehicle 100 travels through part of the fixed portion of the trajectory plan 250 between each update. Accordingly, the trajectory plan 250 is updated in a piecewise manner to add additional target points at the end. Moreover, the fixed portion is also updated, as will be discussed in further detail at 320 by extending the fixed portion in to maintain the separate fixed durations.

At 320, a fixed portion of the trajectory plan is set. In one embodiment, the planning module 220 updates the fixed portion by setting further target points of the trajectory plan 250 to be fixed. That is, the planning module 220 extends the fixed portion further along the trajectory plan 250 as the vehicle 100 progresses along the roadway. In general, the planning module 220 sets the fixed portion of the trajectory plan 250 to include a steering parameter/portion of the trajectory plan to be fixed for a first duration of time and sets a speed parameter of the trajectory plan 250 to be fixed for a second duration of time. Thus, one of the parameters of the fixed portion extends further in time ahead of the vehicle 100 than the other parameter.

Figure 4:
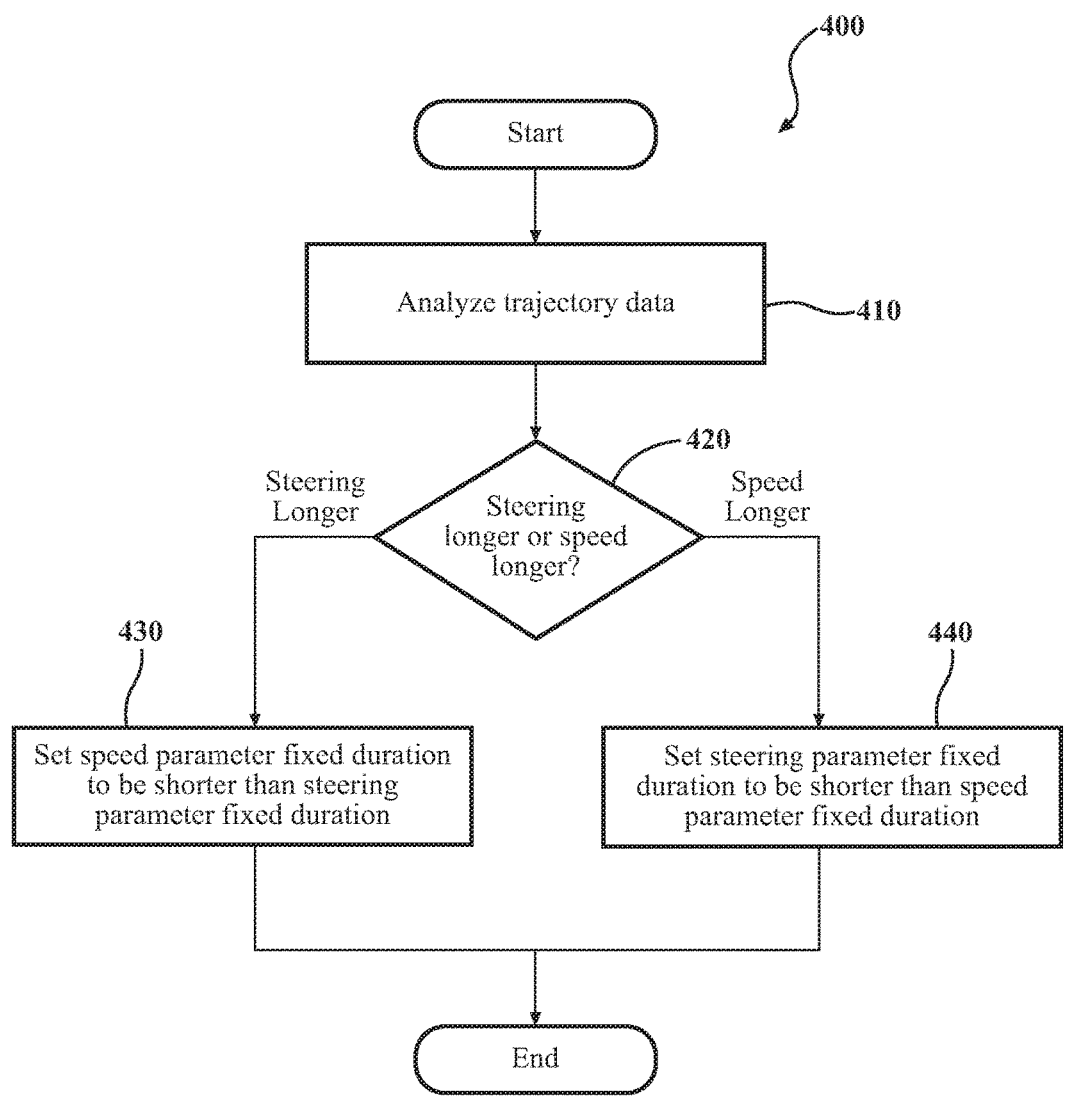
FIG. 4 illustrates one embodiment of a method that is associated with separately selecting fixed durations for steering parameters and speed parameters of a trajectory plan.

As previously discussed, depending on how the planning module 220 is configured and/or depending on dynamic circumstances, as will be further discussed in relation to FIG. 4, either the steering parameter or the speed parameter may be of a shorter duration within the fixed portion of the trajectory plan 250. Thus, the two parameters are of differing durations of time within the trajectory plan 250. Accordingly, as one example, the fixed portion includes a steering parameter that is of a longer fixed duration (e.g., 1.5 seconds) than a fixed duration of the speed parameter (e.g., 0.5 seconds). When configured with the steering parameter having a long duration, the planning module 220 can provide for smoother steering control since the steering parameter is not quickly changing as the driving input controls are computed. In either case, when the fixed portion includes a steering parameter with a duration that is longer than the duration of the speed parameter, the fixed steering parameter extends beyond the fixed speed parameter by an offset (e.g., 1 second). Thus, both parameters are fixed for a duration extending beyond the vehicle 100 as defined by the fixed duration of the speed parameter (e.g., 0.5 seconds) whereas only the steering parameter is fixed for the additional offset up to 1.5 seconds in this example.

Consequently, at 310, target points beyond the fixed duration for the speed parameter may be updated while matching steering parameters may not be updated because those parameters fall within the fixed duration which is an unmodifiable portion of the steering parameter. However, the planning module 220 updates the extent of the fixed portion at each update interval to extend the fixed portion for each of the parameters and thereby maintain the fixed durations for the respective parameters as the vehicle 100 progresses along the roadway.

At 330, trajectory data is collected. In one embodiment, the control module 230 collects data from sensors of the sensor system 120 to determine aspects of a present context of the vehicle 100. The present context generally defines current surroundings of the vehicle 100 and aspects of how the vehicle is presently operating in addition to, for example, relevant data that occurred immediately previously (e.g., braking and acceleration patterns, etc.). In one embodiment, the control module 230 produces the present context as a current location/heading/speed using data from a GPS sensor. In still further embodiments, the control module 230 uses a suite of sensors to collect data about surrounding vehicles (e.g., whether the vehicle 100 is following another vehicle, whether an additional vehicle is next to the vehicle 100), road conditions (e.g., ice, snow, etc.), speed limits, relative speeds of other vehicles, a distance to an off-ramp, types of surrounding vehicles (e.g., large slowly accelerating vehicles vs quickly accelerating sports cars), a presence of pedestrians and/or bicycles, road grade (degree of incline or degree), road curvature, road type (e.g., gravel, asphalt, etc.), and so on.

In further embodiments, the control module 230 can collect information about the vehicle systems 140 including an engine operating temperature, engine RPM, a battery charge level, current control inputs, and other information about a current operating condition of the vehicle 100 that is relevant to updating the trajectory plan 250 and/or computing input controls for autonomously controlling the vehicle 100. In either case, at 330, the control module 230 collects the trajectory data that identifies the present context according to operating characteristics of the vehicle 100 and environmental characteristics about surroundings of the vehicle 100.

At 340, input controls are computed from the fixed portion. In one embodiment, the control module 230 computes the input controls (also referred to as the driving input controls herein) using at least the fixed portion of the trajectory plan 250. In further embodiments, the control module 230 also uses the trajectory data in addition to the fixed portion of the trajectory plan 250. In either case, the control module 230 operates to compute the input controls, in one embodiment, at discrete points in time (e.g., 50 Hz or every 0.02 seconds) as the vehicle 100 progresses along the roadway. Thus, as the vehicle 100 progresses along a roadway, the control module 230 reads the fixed portion for the steering parameters and for the speed parameters that are then used to compute the driving input controls. In the provided example, for every one time that the planning module 220 updates the trajectory plan 250, the control module 230 computes the input controls five times.

Consequently, if the initial portion of the trajectory plan 250 were not fixed, the control module 230 may encounter difficulties with the planning module 220 executing updates while attempting to compute the input controls. However, because the planning module 220 sets the parameters to be fixed for separate initial durations of the trajectory plan 250, this difficulty can be avoided. Moreover, because the speed parameters and steering parameters are set to different durations of time, appropriate adjustments may still be made to the respective parameters so that appropriate maneuvers may be accounted for according to changing aspects of the present context while also providing for a smooth and seamless autonomous operation of the vehicle 100. In this way, autonomous operation of the vehicle 100 is improved.

At 350, the computed input controls are used to control the vehicle 100. In one embodiment, the control module 230 electronically transmits the driving input controls computed at 340 to the vehicle systems 140 in order to control operation of the vehicle 100 autonomously and without manual inputs from a driver.

With reference to FIG. 4, one embodiment of a method 400 is illustrated. Method 400 is associated with dynamically selecting different durations for the steering parameters and the speed parameters of the fixed portion of the trajectory plan 250. The method 400 is discussed separately from the method 300 of FIG. 3; however, in one embodiment, the trajectory planning system 170 executes the method 400 substantially in parallel with method 300. Moreover, as with the method 300, the method 400 will also be discussed from the perspective of the trajectory planning system 170. It should be appreciated that the method 400 is not limited to being implemented within the trajectory planning system 170, but is instead one example of a system that may implement the method 400.

At 410, the planning module 220 analyzes the trajectory data. In one embodiment, the planning module 220 analyzes the trajectory data that is collected at block 330 of method 300 as shown in FIG. 3. Furthermore, the planning module 220, in one embodiment, analyzes the trajectory data by comparing the trajectory data with known indicators for which different durations of the parameters are preferred. In one embodiment, the planning module 220 identifies a particular environmental condition (e.g., number of lanes on a road, a width of the road, etc.) or a particular location (e.g., highway vs. city streets) as a manner of determining durations to set for the respective parameters of the fixed portion.

Accordingly, at 420, the planning module 220 determines whether the steering parameter is to be fixed for a shorter duration or whether the speed parameter is to be fixed for a shorter duration. That is, the planning module 220 determines which of the parameters is to have a shorter fixed duration relative to the other parameter at 420. Accordingly, if the planning module 220 determines that the speed parameter is to be fixed for a shorter duration than the steering parameter, then processing proceeds to block 430. However, if the planning module 220 determines that the steering parameter is to be fixed for a shorter duration than the speed parameter then processing proceeds to block 440.

In general, the planning module 220 identifies the steering parameter as the parameter to fix for a shorter relative duration when, for example, speed is likely to be maintained in a consistent manner, but steering may be more frequently adjusted to maneuver around traffic or other obstacles. One example of such a circumstance is highway driving, when the vehicle 100 is traveling along a highway, the speed of the vehicle 100 is likely to remain somewhat constant whereas the steering is relatively more likely to vary because of traffic and other factors related to driving on a highway.

By contrast, the planning module 220 identifies the speed as the parameter to fix for a shorter relative duration when, for example, steering is likely to be maintained in a consistent manner. One example of such a circumstance is traveling along a road that is narrow, e.g., within a tunnel. Another example of such a circumstance is driving within heavy traffic or within an urban area with many changes in speed from traffic signs, pedestrians, and other obstacles.

At 430, the planning module 220 sets the speed parameter to have a fixed duration (e.g., 0.5 s) that is of a shorter relative duration than the steering parameter (e.g., 1.5 s). In one embodiment, the planning module 220 sets one or more configuration parameters that control durations for setting the fixed portion of the trajectory plan 250 when updating. In either case, the planning module 220 adjusts how the trajectory plan 250 is updated so that the fixed portion includes the speed parameter with a shorter duration than the steering parameter.

Figure 5:
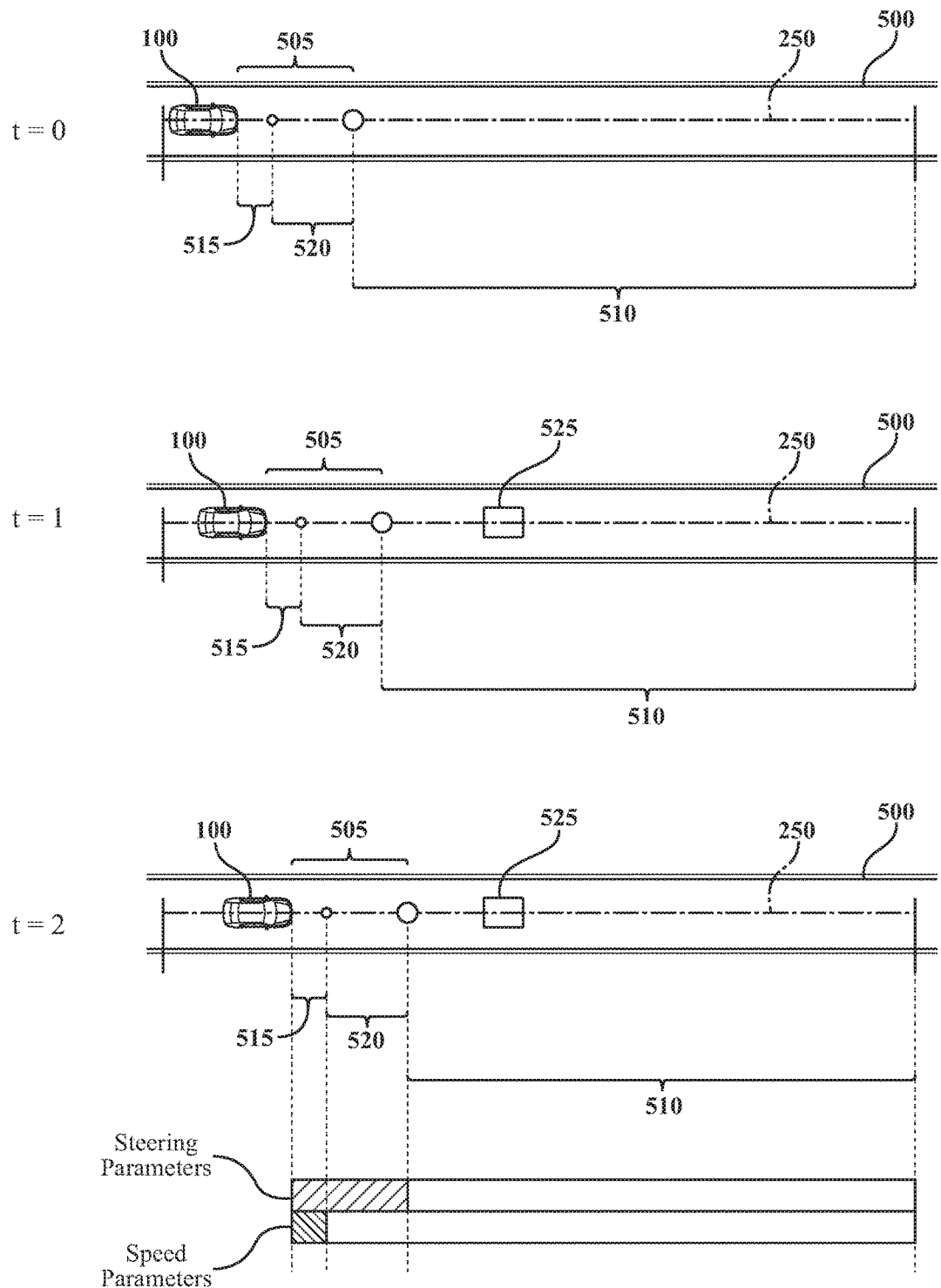
FIG. 5 illustrates an example of a trajectory plan that may be generated according to systems and methods disclosed herein.

As one example, consider FIG. 5. FIG. 5 illustrates one example of a circumstance within which the speed parameter within the fixed portion of the trajectory plan is of a relative shorter duration than the steering parameter. For example, in FIG. 5, the vehicle 100 is illustrated traveling along a roadway 500 at three separate times. Accordingly, the three separate illustrations in FIG. 5 show the vehicle 100 progressing along the roadway 500 and following the trajectory plan 250. The trajectory plan, as illustrated in FIG. 5, includes a fixed portion 505 and additional target points 510 beyond the fixed portion 505. Moreover, the fixed portion 505 includes a first sub-portion 515 and a second sub-portion 520. The first sub-portion 515 represents target points for the speed parameter and the steering parameter that are both fixed. The second sub-portion 520, as illustrated in FIG. 5, illustrates target points where the speed parameter is modifiable but the steering parameter is still fixed. Accordingly, the difference between 515 and 520 is an offset in fixed durations for the parameters where the speed parameter can be modified when the planning module 220 updates the trajectory plan 250, but the steering parameter may not be updated. Thus, the parameters are of different fixed durations.

Additionally, FIG. 5 illustrates a progression of the vehicle 100 along the roadway 500 as an object 525 moves into a course/path of the vehicle 100 as defined by the trajectory plan 250. Accordingly, because the speed parameter is of a shorter fixed duration than the steering parameter within the fixed portion 505, the planning module 220 can more quickly adjust the trajectory plan 250 for speed to avoid colliding with the object 525. Moreover, as the vehicle 100 progresses from t=0, to t=1, to t=2, FIG. 5 shows how the trajectory plan 250 is updated to adjust target points that are not fixed and to set further target points along the trajectory plan 250 to be fixed as the vehicle 100 travels along the roadway 500. In this way, the fixed portion 505 is maintained separately for the individual parameters as the trajectory plan 250 is updated while the vehicle 100 is in route. It should be generally appreciated, that the manner of updating the fixed portion 505 by fixing additional portions of the trajectory plan 250 for the separate parameters generally includes setting additional target points to be fixed as the vehicle 100 progresses as opposed to waiting until the vehicle 100 nears an endpoint of the fixed portion 505 to update the fixed portion 505 overall. Thus, the fixed portion 505 is updated in a piecewise manner as the vehicle 100 progresses along the roadway.

Returning to FIG. 4, at 440, the planning module 220 sets the steering parameter to have a fixed duration that is of a shorter relative duration than the speed parameter within the fixed portion. In one embodiment, the planning module 220 sets one or more configuration parameters that control setting the fixed portion of the trajectory plan 250 when updating. Consequently, the planning module 220 dynamically selects a fixed duration for the steering and speed parameters as outlined at 430 and 440.

Figure 6:
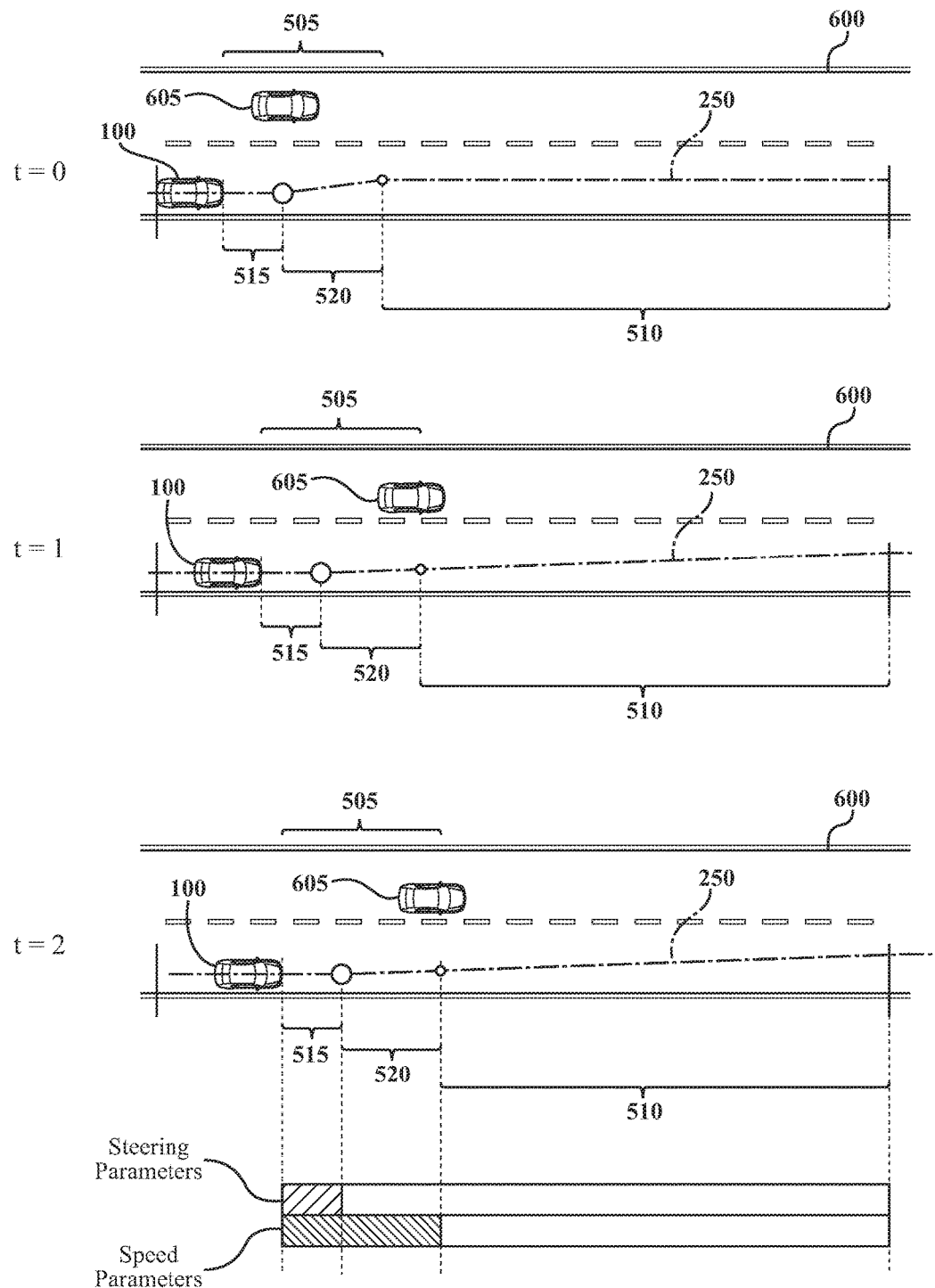
FIG. 6 illustrates another example of a trajectory plan that may be generated according to systems and methods disclosed herein.

As one example, consider FIG. 6 which illustrates the vehicle 100 traveling along a two-lane road 600. FIG. 6 illustrates one example of a circumstance within which the steering parameter of the fixed portion of the trajectory plan 250 is of a relative shorter duration than the speed parameter. The steering is set to a relative shorter fixed duration in comparison to the speed parameter since, for example, the roadway 600 is a highway or similar route along which the speed is relatively consistent. For example, in FIG. 6, the vehicle 100 is illustrated traveling along the roadway 600 at three separate points in time. Accordingly, the three separate illustrations in FIG. 6 show the vehicle 100 progressing along the roadway 600 and following the trajectory plan 250. The trajectory plan 250, as illustrated in FIG. 6, includes the same sections as shown in FIG. 5 except that the parameters of the fixed portion 505 are of different durations. Thus, in FIG. 6 the second sub-portion 520 illustrates target points where the steering parameter is modifiable, but the speed parameter remains fixed. Thus, the steering parameters of the trajectory plan 250 may be modified at a closer point out from the vehicle 100 permitting the planning module 220 to update how the vehicle 100 is to be steered away from objects such as the vehicle 605 that is veering close to the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include data about roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data e.g., data about a present context. "Driving environment data" includes data or information about the external environment/surroundings in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trajectory planning system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trajectory planning system 170, and/or the autonomous driving module(s) 160 may control some or all of these vehicle systems 140 and, thus, may be partially or fully autonomous.

The processor(s) 110, the trajectory planning system 170, and/or the autonomous driving module(s) 160 can be operatively connected to communicate with the various vehicle systems 140 and/or individual components thereof. For example, returning to FIG. 1, the processor(s) 110, the trajectory planning system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trajectory planning system 170, and/or the autonomous driving module(s) 160 may control some or all of these vehicle systems 140.

The processor(s) 110, the trajectory planning system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trajectory planning system 170, and/or the autonomous driving module(s) 160 can control the direction and/or speed of the vehicle 100. The processor(s) 110, the trajectory planning system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160, in one embodiment, operates in conjunction with the trajectory planning system 170. Alternatively, in one embodiment, the autonomous driving module 160 is embodied within the trajectory planning system 170 as part of the planning module 220 and/or the control module 230. In either case, the autonomous driving module 160 may receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trajectory planning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A trajectory planning system for autonomously controlling a vehicle according to a trajectory plan, comprising:
   one or more processors;
   a memory communicably coupled to the one or more processors and storing:
   a planning module including instructions that when executed by the one or more processors cause the one or more processors to update, upon traveling over at least a portion of a current segment of a roadway, the trajectory plan for a subsequent segment of the roadway by setting a fixed portion of the trajectory plan to include: (i) a steering parameter to be fixed for a first duration of time and (ii) a speed parameter to be fixed for a second duration of time, wherein the first duration of time and the second duration of time are of different lengths; and
   a control module including instructions that when executed by the one or more processors cause the one or more processors to compute input controls for autonomously controlling the vehicle according to the fixed portion of the trajectory plan, and
   wherein the control module includes instructions to control the vehicle over the subsequent segment of the roadway according to the input controls.

2. The trajectory planning system of claim 1, wherein the second duration of time for the speed parameter is shorter than the first duration of time for the steering parameter.

3. The trajectory planning system of claim 1, wherein the first duration of time for the steering parameter is shorter than the second duration of time of the speed parameter.

4. The trajectory planning system of claim 1, wherein the planning module includes instructions to dynamically select relative lengths of time for the first duration and the second duration according to trajectory data that identifies a present context of the vehicle.

5. The trajectory planning system of claim 4, wherein the control module includes instructions to collect, from sensors of the vehicle, the trajectory data that identifies a present context according to operating characteristics of the vehicle and environmental characteristics about surroundings of the vehicle.

6. The trajectory planning system of claim 1, wherein the trajectory plan defines a course along the roadway for autonomously controlling the vehicle, wherein the first duration and the second duration are partially coextensive according to an offset between the first duration and the second duration, and wherein the fixed portion of the trajectory plan is unmodifiable once set to maintain consistent operation of the vehicle along the course on the roadway.

7. The trajectory planning system of claim 1, wherein the planning module further includes instructions to update the trajectory plan by adjusting target points in the trajectory plan beyond a current segment prior to fixing the first duration and the second duration for the steering parameter and the speed parameter.

8. The trajectory planning system of claim 1, wherein the control module further includes instructions to compute the input controls by computing the input controls from the fixed portion at discrete points in time along the trajectory plan, wherein the input controls include at least steering inputs, accelerator inputs, and braking inputs.

9. A non-transitory computer-readable medium storing instructions that when executed by one or more processors cause the one or more processors to:
update, upon traveling over at least a portion of a current segment of a roadway, a trajectory plan for a subsequent segment of the roadway by setting a fixed portion of the trajectory plan to include: (i) a steering parameter to be fixed for a first duration of time and (ii) a speed parameter to be fixed for a second duration of time, wherein the first duration of time and the second duration of time are of different lengths;
compute input controls for autonomously controlling a vehicle according to the fixed portion of the trajectory plan; and
control the vehicle over the subsequent segment of the roadway according to the input controls.

10. The non-transitory computer-readable medium of claim 9, wherein the second duration of time for the speed parameter is shorter than the first duration of time for the steering parameter.

11. The non-transitory computer-readable medium of claim 9, wherein the first duration of time for the steering parameter is shorter than the second duration of time of the speed parameter.

12. The non-transitory computer-readable medium of claim 9, wherein the trajectory plan defines a course along the roadway for autonomously controlling the vehicle, wherein the first duration and the second duration are partially coextensive according to an offset between the first duration and the second duration, and wherein the fixed portion of the trajectory plan is unmodifiable once set to maintain consistent operation of the vehicle along the course on the roadway.

13. The non-transitory computer-readable medium of claim 9, wherein the instructions to update the trajectory plan include instructions to adjust target points in the trajectory plan beyond a current segment prior to fixing the first duration and the second duration for the steering parameter and the speed parameter.

14. A method of autonomously controlling a vehicle according to a trajectory plan, comprising:
updating, upon traveling over at least a portion of a current segment of a roadway, the trajectory plan for a subsequent segment of the roadway by setting a fixed portion of the trajectory plan to include: (i) a steering parameter to be fixed for a first duration of time and (ii) a speed parameter to be fixed for a second duration of time, wherein the first duration of time and the second duration of time are of different lengths;
computing input controls for autonomously controlling the vehicle according to the fixed portion of the trajectory plan; and
controlling the vehicle according to the input controls over the subsequent segment of the roadway.

15. The method of claim 14, wherein the second duration of time for the speed parameter is shorter than the first duration of time for the steering parameter.

16. The method of claim 14, wherein the first duration of time for the steering parameter is shorter than the second duration of time of the speed parameter.

17. The method of claim 14, further comprising:
dynamically selecting lengths of time for the first duration and the second duration according to trajectory data that identifies a present context of the vehicle.

18. The method of claim 17, further comprising:
collecting, from sensors of the vehicle, the trajectory data that identifies a present context according to operating characteristics of the vehicle and environmental characteristics about surroundings of the vehicle.

19. The method of claim 14, wherein the trajectory plan defines a course along the roadway for autonomously controlling the vehicle, wherein the first duration and the second duration are partially coextensive according to an offset between the first duration and the second duration, and wherein the fixed portion of the trajectory plan is unmodifiable once set to maintain consistent operation of the vehicle along the trajectory plan on the roadway.

20. The method of claim 14, wherein updating the trajectory plan includes adjusting target points in the trajectory plan beyond a current segment prior to fixing the first duration and the second duration for the steering parameter and the speed parameter, and
wherein computing the input controls includes computing the input controls from the fixed portion at discrete points in time along the trajectory plan.

* * * * *